United States Patent
Lee et al.

(10) Patent No.: US 7,663,875 B2
(45) Date of Patent: Feb. 16, 2010

(54) COMPUTER ENCLOSURE WITH AIRFLOW-GUIDING DEVICE

(75) Inventors: Sheng-Hung Lee, Taipei Hsien (TW); Xiu-Zhong Yin, Shenzhen (CN); Li-Ping Chen, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/205,157

(22) Filed: Sep. 5, 2008

(65) Prior Publication Data
US 2010/0014245 A1   Jan. 21, 2010

(30) Foreign Application Priority Data
Jul. 18, 2008   (CN) .................. 2008 2 0301547

(51) Int. Cl.
*H05K 7/20* (2006.01)
(52) U.S. Cl. .................. 361/679.46; 361/679.49; 361/679.51; 361/690; 361/695; 165/104.33; 165/122; 165/124; 454/184
(58) Field of Classification Search ........... 361/679.46, 361/679.47, 679.48, 679.49, 679.51, 690–697, 361/722–727; 165/104.33, 104.34, 185, 165/121–127, 104.21; 454/184; 174/15.1
See application file for complete search history.

(56) References Cited

U.S. PATENT DOCUMENTS

| | | | | |
|---|---|---|---|---|
| 5,310,228 A | * | 5/1994 | Ellenberg | 292/167 |
| 5,432,674 A | * | 7/1995 | Hardt | 361/694 |
| 5,963,424 A | * | 10/1999 | Hileman et al. | 361/695 |
| 6,504,718 B2 | * | 1/2003 | Wu | 361/695 |
| 6,771,499 B2 | * | 8/2004 | Crippen et al. | 361/679.48 |
| 7,262,964 B1 | * | 8/2007 | Barsun | 361/695 |
| 7,447,021 B2 | * | 11/2008 | Chen | 361/695 |
| 7,474,526 B2 | * | 1/2009 | Fujiwara | 165/104.21 |
| 7,542,289 B2 | * | 6/2009 | Tsai et al. | 361/695 |
| 7,586,746 B2 | * | 9/2009 | Liu | 361/695 |
| 2008/0117589 A1 | * | 5/2008 | Carrera et al. | 361/687 |
| 2009/0027852 A1 | * | 1/2009 | Roesner et al. | 361/690 |
| 2009/0233537 A1 | * | 9/2009 | Kao et al. | 454/184 |

* cited by examiner

*Primary Examiner*—Michael V Datskovskiy
(74) *Attorney, Agent, or Firm*—Clifford O. Chi

(57) ABSTRACT

A computer enclosure includes a chassis, an airflow-guiding device, and a mounting mechanism. The chassis includes a mounting bracket. The mounting bracket defines a receiving slot therein. The airflow-guiding device is mounted to the chassis adjacent to the mounting bracket. The mounting mechanism is installed on the airflow-guiding device. The mounting mechanism includes a hook received in the receiving slot and configured to mount the airflow-guiding device to the chassis. The mounting mechanism is configured to slide on the airflow-guiding device to disengage the hook from the receiving slot.

16 Claims, 5 Drawing Sheets

COMPUTER ENCLOSURE WITH AIRFLOW-GUIDING DEVICE

BACKGROUND

1. Field of the Invention

The present invention relates to computer enclosures and, more particularly, to a computer enclosure with an airflow-guiding device.

2. Description of Related Art

Generally, electronic components in a computer generate heat. Some electronic components require additional heat dissipation means such as airflow-guiding devices for guiding airflow to dissipate heat. The airflow-guiding devices are usually fixed to the computer by bolts or screws. Installing the airflow-guiding devices with many fasteners is laborious, time-consuming, and inconvenient.

What is needed, therefore, is a computer enclosure with an improved airflow-guiding device to overcome the above-described shortcomings.

DETAILED DESCRIPTION

Figure 1:
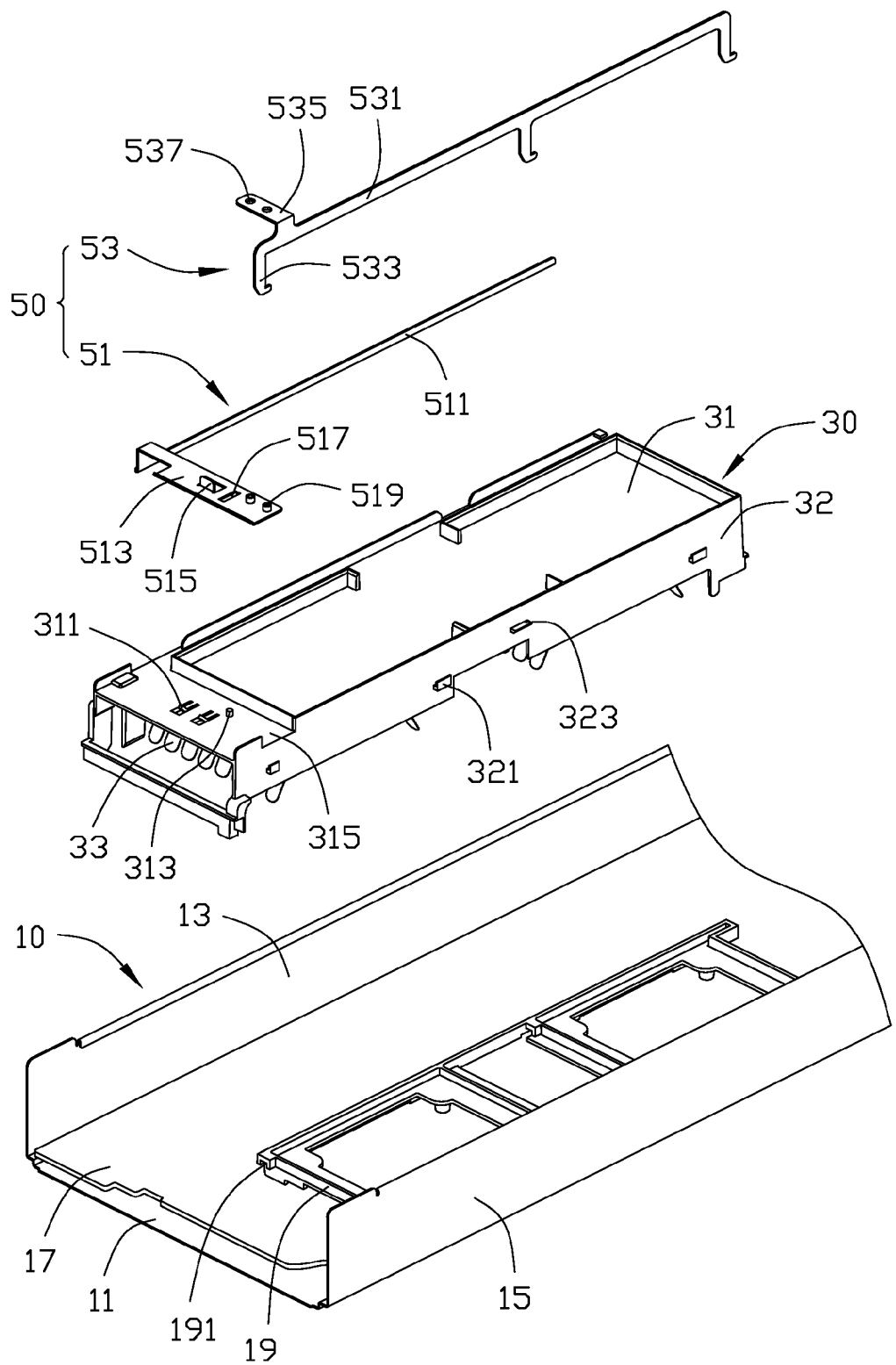
FIG. 1 is an exploded, isometric view of an embodiment of a computer enclosure with an airflow-guiding device.
Figure 2:
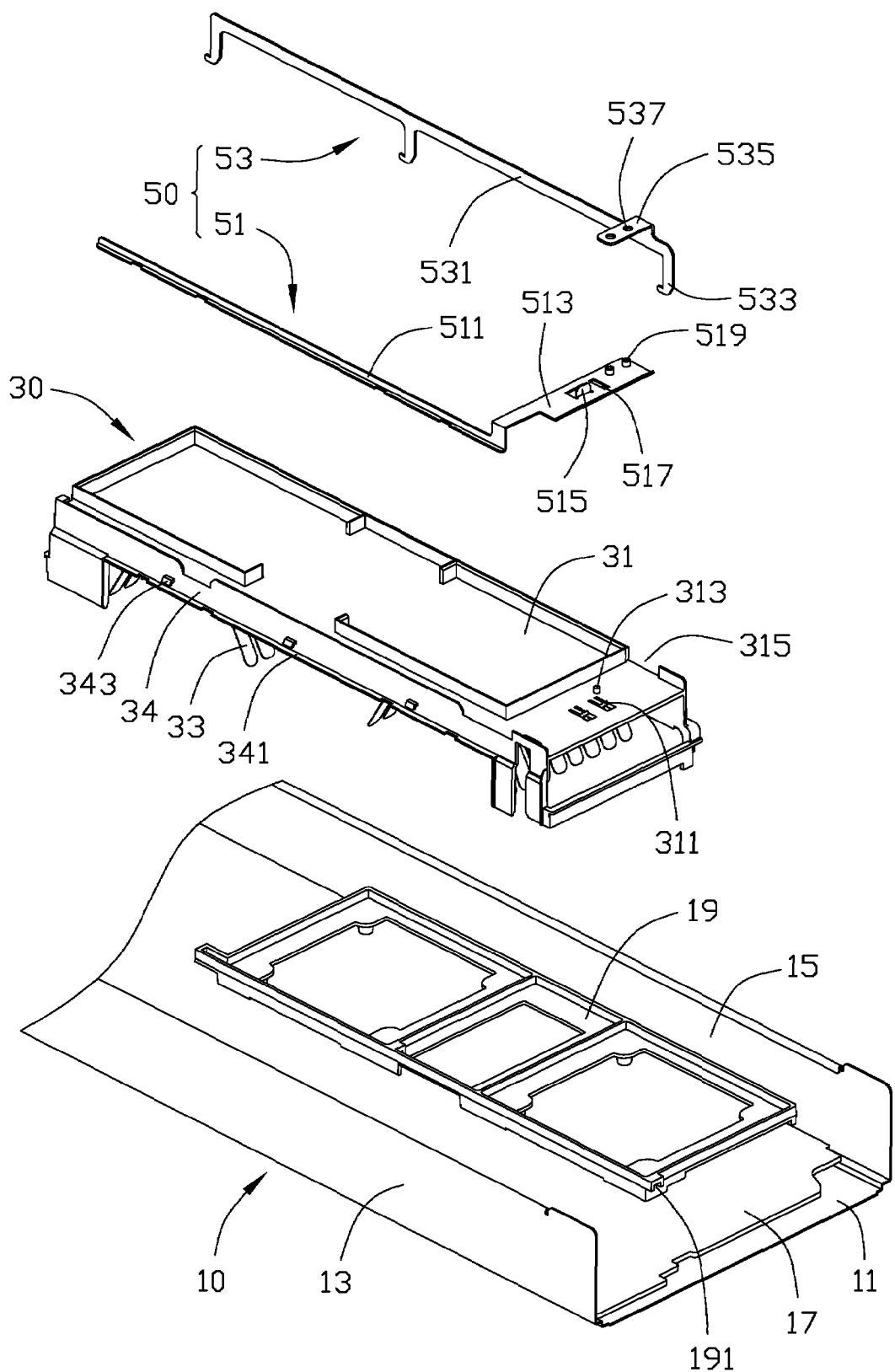
FIG. 2 is similar to FIG. 1, but viewed from another aspect.
Figure 3:
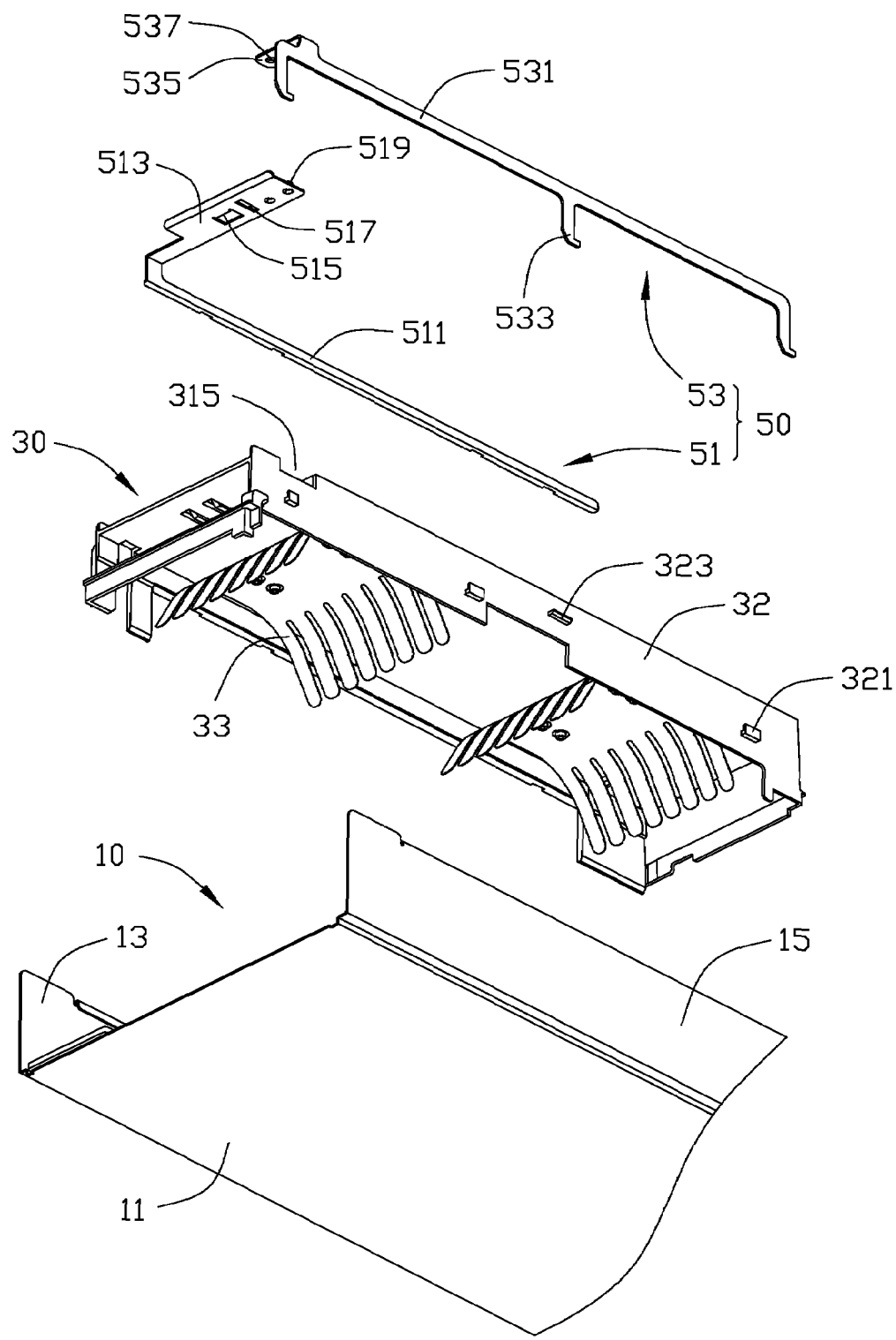
FIG. 3 is similar to FIG. 1, but viewed from a third aspect.

Referring from FIG. 1 to FIG. 3, an embodiment of a computer enclosure with an airflow-guiding device includes a chassis 10, an airflow-guiding device 30 detachably mounted to the chassis 10, and a mounting mechanism 50 for mounting the airflow-guiding device 30 to the chassis 10.

The chassis 10 includes a bottom panel 11 and parallel side panels 13, 15 extending substantially perpendicularly from opposite edges of the bottom panel 11. A motherboard 17 is mounted to the bottom panel 11, and a mounting bracket 19 is installed on the motherboard 17 adjacent to the side panel 15. The mounting bracket 19 defines a plurality of receiving slots 191 in a side edge of the mounting bracket 19 parallel to the side panel 15. Each receiving slot 191 includes a top surface, and two side surfaces perpendicular to the top surface. In one embodiment, the receiving slots 191 include three receiving slots correspondingly located in a center portion and two ends of the side edge.

The airflow-guiding device 30 includes a top wall 31, a first side wall 34, and a second side wall 32 extending perpendicularly from opposite sides of the top wall 31. Two elastic clips 311 may be punched from one side of the top wall 31. A protrusion 313 protrudes from the top wall 31 adjacent to the elastic clips 311. Two airflow-guiding pieces 33 are secured to a bottom surface of the top wall 31. A plurality of locating blocks 321 is formed and spaced apart linearly on an outer surface of the second side wall 32. A stopper portion 323 is formed on the outer surface of the side wall 32 at a distance to a bottom edge of the side wall 32 greater than a distance from the locating blocks 321 to the bottom edge of the side wall 32. A rectangular opening 315 is defined on a top edge of the second side wall 32 and adjacent to the protrusion 313 of the top wall 31. A supporting piece 341 extends from a bottom edge of the first side wall 34, and a plurality of pressing portions 343 are formed on an outer surface of the first side wall 34 at a distance to a bottom edge of the side wall 34 greater than a distance from the supporting piece 341 to the bottom edge of the side wall 34, thereby forming a sliding groove between the pressing portions 343 and the supporting piece 341.

The mounting mechanism 50 includes a sliding member 51 and a securing member 53 installed on the sliding member 51. The sliding member 51 has an elongated sliding portion 511 and a connecting piece 513 extending perpendicularly from one end of the sliding portion 511. An actuating portion 515 may be punched perpendicularly from a center of the connecting piece 513. A positioning slot 517 is defined on the connecting piece 513 adjacent to the operating portion 515. Two mounting posts 519 protrude perpendicularly from the connecting piece 513 adjacent to the positioning slot 517. The securing member 53 has an elongated locating portion 531, and an L-shaped hook 533 extending from a bottom edge of the locating portion 531, corresponding to each receiving slot 191 of the mounting bracket 19. Each hook 533 includes a cantilever extending toward the bottom panel 11 and a clasp protruding perpendicularly from a free end of the cantilever. A securing piece 535 extends perpendicularly from a top edge of the locating portion 531, and two mounting holes 537 are defined in the securing piece 535 corresponding to the two mounting posts 519.

A width of the sliding portion 511 is substantially the same as a vertical distance between the pressing portions 343 and the supporting piece 341. The sliding portion 511 can be slidably confined between the pressing portions 343 and the supporting piece 341, and slidable in the sliding groove formed between the pressing portions 343 and the supporting piece 341, but restricted from moving along a direction perpendicular to the supporting piece 341. A width of the locating portion 531 is substantially the same as a vertical distance between the stopper portion 323 and each locating block 321. The locating portion 531 may be blocked between the stopper portion 323 and the locating blocks 321, and slide between the stopper portion 323 and the locating blocks 321. A width of the securing piece 535 is less than a width of the opening 315, so that the securing piece 535 is capable of moving in the opening 315.

Figure 4:
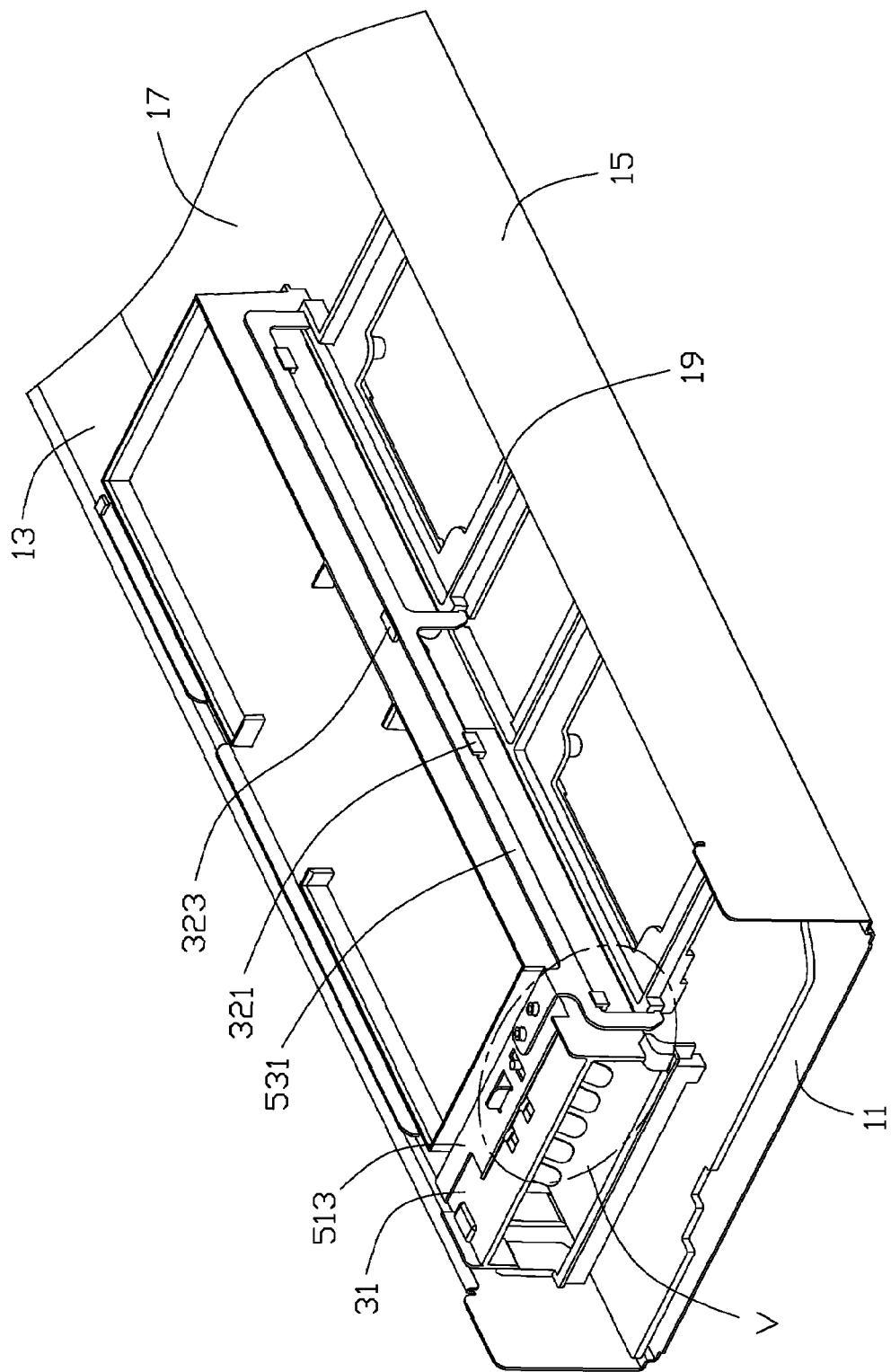
FIG. 4 is an assembled isometric view of the computer enclosure with the airflow-guiding device of FIG. 1.
Figure 5:
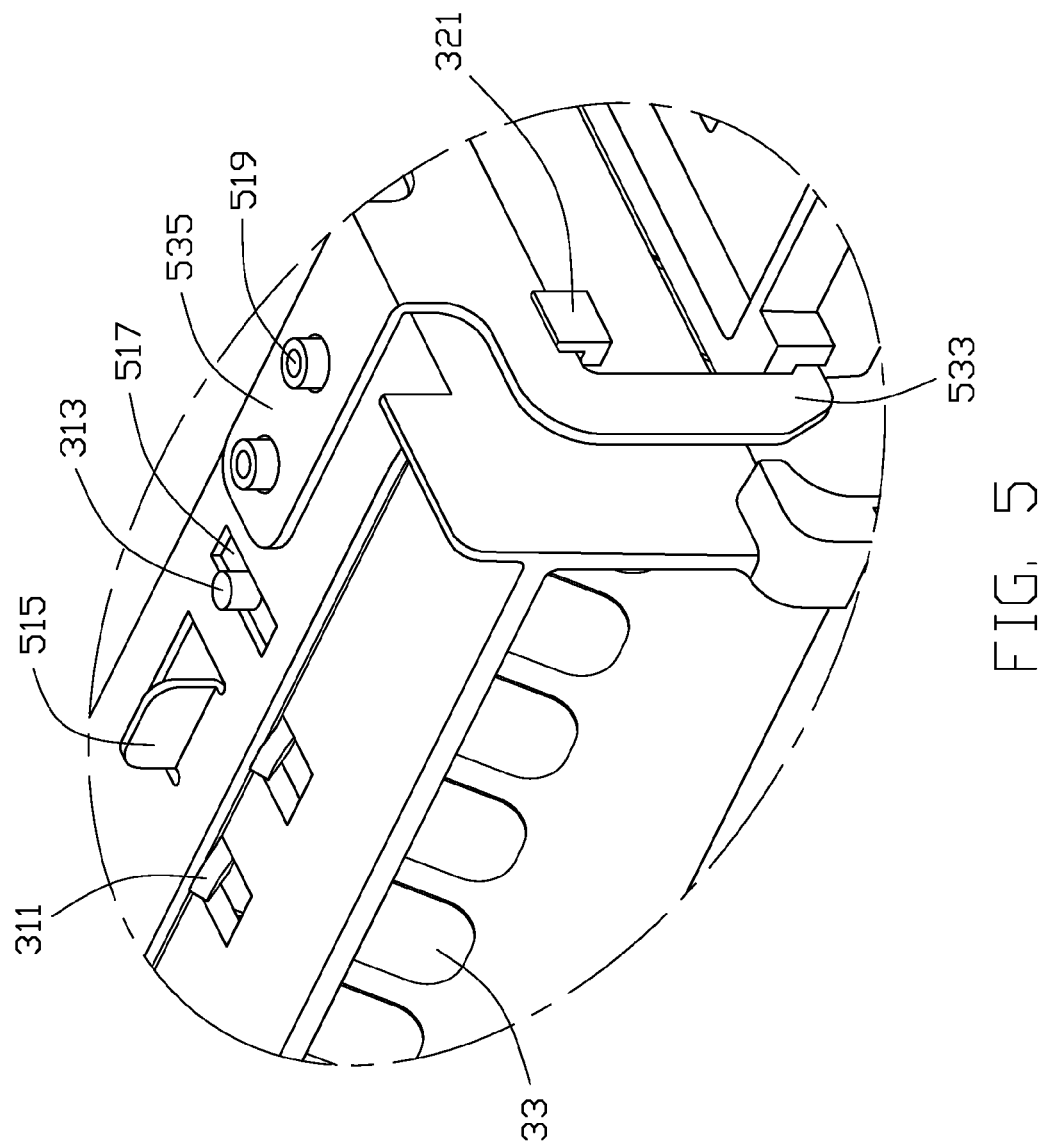
FIG. 5 is an enlarged isometric view of circled region V in FIG. 4.

Referring to FIGS. 4 and 5, in assembly, the airflow-guiding device 30 is positioned on the motherboard 17 between the mounting bracket 19 and the side panel 13 of the chassis 10. The sliding member 51 is bound on the airflow-guiding device 30. The sliding portion 511 is located in the sliding groove between the pressing portions 343 and the supporting piece 341 of the first side wall 34. The connecting piece 513 lies on the top wall 31 of the airflow-guiding device 30. The two elastic clips 311 of the top wall 31 abut against one edge of the connecting piece 513, and the protrusion 313 of the top wall 31 is received in the positioning slot 517. The securing member 53 is mounted to the sliding member 51, also bounding the airflow-guiding device 30. The securing piece 535 of the securing member 53 is located in the opening 315 of the airflow-guiding device 30. The locating portion 531 is located between the stopper portion 323 and the locating blocks 321. The mounting posts 519 of the sliding member 51 are inserted and secured into the corresponding mounting hole 537 of the securing member 53. An inner surface of each hook 533 of the securing member 53 abuts against the second side wall 32 of the airflow-guiding device 30. The clasp of each hook 533 is engaged and engaged in the corresponding receiving slot 191 of the mounting bracket 19, and the clasp abuts against the top surface and the two side surfaces of the corresponding receiving slot 191. The airflow-guiding device 30 cannot move in a first direction perpendicular to the bottom panel 11 of the chassis 10, and is fixed in the chassis 10. In another embodiment, after the sliding member 51 is installed on the airflow-guiding device 30, the assembly of the sliding member 51 and the airflow-guiding device 30 can be installed in the chassis 10, and then the securing member 53 is fixed in the chassis 10.

In disassembly, the operating portion 515 is pushed in a second direction perpendicular to the first direction towards the elastic clips 311, and the sliding member 51 slides horizontally with the securing member 53 to disengage the hooks 533 from the corresponding receiving slots 191 of the mounting bracket 19. The two elastic clips 311 on the top wall 31 of the airflow-guiding device 30 are pressed by the edge of the connecting piece 513 of the sliding member 51 to deform elastically. The airflow-guiding device 30 and the mounting mechanism 50 can be removed from the chassis 10.

It is to be understood, however, that even though numerous characteristics and advantages of the embodiments have been set forth in the foregoing description, together with details of the structure and function of the invention, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A computer enclosure, comprising:
   a chassis comprising a mounting bracket, the mounting bracket defining a receiving slot therein;
   an airflow-guiding device mounted to the chassis adjacent to the mounting bracket; and
   a mounting mechanism attached on the airflow-guiding device, the mounting mechanism comprising a hook received in the receiving slot and configured to mount the airflow-guiding device to the chassis, the mounting mechanism is configured to slide on the airflow-guiding device to disengage the hook from the receiving slot.

2. The computer enclosure of claim 1, wherein the chassis further comprises a bottom panel; the hook comprises a cantilever and a clasp protruding perpendicularly from a free end of the cantilever, the cantilever extends toward the bottom panel and the clasp is engaged in the receiving slot.

3. The computer enclosure of claim 2, wherein the receiving slot comprises a top surface, and two side surfaces perpendicular to the top surface, the clasp abuts against the top surface and the two side surfaces, thereby fixing the hook to the receiving slot, and preventing the airflow-guiding device from moving in a first direction perpendicular to the bottom panel of the chassis.

4. The computer enclosure of claim 2, wherein the chassis further comprises two parallel side panels perpendicular to the bottom panel, and a motherboard mounted on the bottom panel; the mounting bracket is installed on the motherboard adjacent to a first of the two side panels; the airflow-guiding device is mounted between the mounting bracket and a second of the two side panels.

5. The computer enclosure of claim 1, wherein the mounting mechanism comprises a sliding member and a securing member mounted to the sliding member; the hook is formed on the securing member.

6. The computer enclosure of claim 5, wherein the airflow-guiding device comprises a top wall, a first side wall, and a second side wall perpendicular to the top wall; an elastic clip is punched from the top wall; the sliding member comprises a connecting piece abutting against the top wall and an elongated sliding portion perpendicular to the connecting piece and slidably installed on the first side wall; the elastic clip abuts against one edge of the connecting piece.

7. The computer enclosure of claim 6, wherein a supporting piece extends from a bottom edge of the first side wall to support the sliding portion; a plurality of pressing portions are formed on the first side wall above the supporting piece, thereby preventing the sliding portion from moving perpendicular to the supporting piece.

8. The computer enclosure of claim 6, wherein a protrusion protrudes from the top wall of the airflow-guiding device; the connecting piece defines a positioning slot corresponding to the protrusion for the protrusion sliding therein.

9. The computer enclosure of claim 6, wherein at least one mounting post protrudes from the connecting piece; the securing member comprises a locating portion located on the second side wall of the airflow-guiding device and a securing piece perpendicular to the locating portion, the securing piece defines a mounting hole for the mounting post inserting therein, the hook extends from a bottom edge of the locating portion.

10. A computer enclosure, comprising:
    a chassis comprising a bottom panel, a receiving slot being defined in the chassis;
    an airflow-guiding device detachably mounted in the chassis, the airflow-guiding device comprising a top wall, a first side wall, and a second side wall extending perpendicularly to the top wall;
    a sliding member attached to the first side wall; and
    a securing member attached to the second side wall of the airflow-guiding device, the securing member being fixed on the sliding member, a hook extends from the securing member;
    wherein the hook is configured to engage with the receiving slot to prevent the airflow-guiding device from moving in a first direction perpendicular to the bottom panel of the chassis, thereby fixing the airflow-guiding device in the chassis; the sliding member is configured to slide in a second direction perpendicular to the first direction to drive the hook of the securing member to disengage from the receiving slot, thereby moving the airflow-guiding device outside the chassis.

11. The computer enclosure of claim 10, wherein the chassis comprises two parallel side panels perpendicular to the bottom panel, and a motherboard mounted on the bottom panel; a mounting bracket is mounted on the motherboard adjacent to a first of the two parallel side panels; the airflow-guiding device is mounted between the mounting bracket and a second of the two parallel side panels; the receiving slot is defined in the mounting bracket.

12. The computer enclosure of claim 10, wherein the hook comprises a cantilever and a clasp protruding perpendicularly from a free end of the cantilever, the cantilever extends toward the bottom panel and the clasp is engaged in the receiving slot.

13. The computer enclosure of claim 10, wherein an elastic clip is punched on the top wall, the sliding member comprises a connecting piece abutting against the top wall and an elongated sliding portion perpendicular to the connecting piece and slidably installed on the first side wall; the elastic clip abuts against one edge of the connecting piece.

14. The computer enclosure of claim 13, wherein a supporting piece extends from a bottom edge of the first side wall to support the sliding portion, and a plurality of pressing portions are formed on the first side wall above the supporting piece, thereby preventing the sliding portion from moving perpendicular to the supporting piece.

15. The computer enclosure of claim 13, wherein a protrusion protrudes from the top wall of the airflow-guiding device; the connecting piece defines a positioning slot corresponding to the protrusion for the protrusion sliding therein.

16. The computer enclosure of claim 13, wherein at least one mounting post protrudes from the connecting piece; the securing member comprises an elongated locating portion located on the second side wall of the airflow-guiding device and a securing piece perpendicular to the locating portion, the securing piece defines a mounting hole corresponding to the mounting post, the hook extends from a bottom edge of the locating portion.

* * * * *